Figure 1:
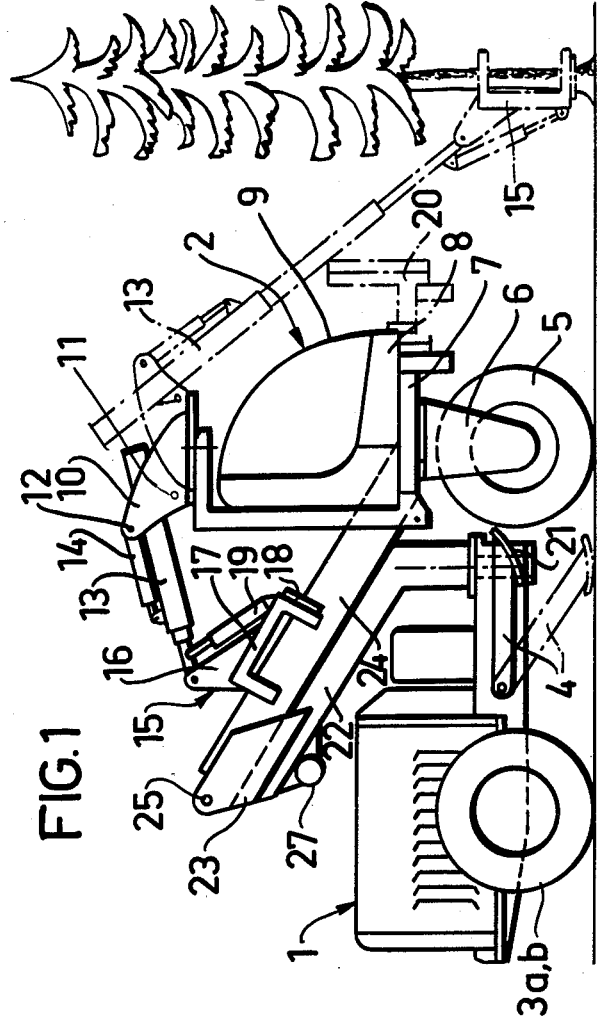

United States Patent [19]

Lindblom

[11] Patent Number: 4,579,157
[45] Date of Patent: Apr. 1, 1986

[54] MOBILE FOREST THINNING MACHINE

[75] Inventor: K. Thore Lindblom, Bränderna, Sweden

[73] Assignee: OSA AB, Alfta, Sweden

[21] Appl. No.: 534,117

[22] Filed: Sep. 20, 1983

[30] Foreign Application Priority Data

Sep. 20, 1982 [SE] Sweden .............................. 8205371

[51] Int. Cl.⁴ .............................................. A01G 23/08
[52] U.S. Cl. .................................... 144/3 D; 144/335
[58] Field of Search ......................... 144/3 D, 335, 336

[56] References Cited

U.S. PATENT DOCUMENTS 4,371,017  2/1983  Lindblom ........................... 144/3 D

FOREIGN PATENT DOCUMENTS 654215  3/1979  U.S.S.R. ............................. 144/3 D
793490  1/1981  U.S.S.R. ............................. 144/3 D

Primary Examiner—W. D. Bray
Attorney, Agent, or Firm—Cushman, Darby & Cushman

[57] ABSTRACT

The invention relates to a mobile thinning machine. It comprises according to the invention a two-wheeled drive unit (1) with motor and hydraulic unit and a logging unit (2) carried on a dirigible and driven supporting wheel (5), with driver's cab (8), pivotal boom (13), felling unit (15) and clamping bunk (20). The logging unit (2) is connected to the drive unit via an articulate frame steering (21) with a bracket (22) and a telescopic arm (24) extending therefrom. The articulate frame steering (21) permits the two units (1,2) to be put at an angle of more then 90° relative to each other. The telescopic arm (24) houses necessary hydraulic and electric lines all the way to the logging unit (2) for operating this unit from the driver's cab (8). The telescopic arm (24) can be moved back over the drive unit (1), so that this unit together with the logging unit (2) forms a compact three-wheeled vehicle for transport between the thinning places. The two-wheeled drive unit (1) is provided with lowerable supporting legs (4) for stabilizing the unit when the logging unit (2) is put at an angle and moved out for thinning.

7 Claims, 5 Drawing Figures

MOBILE FOREST THINNING MACHINE

This invention relates to a mobile forest thinning machine.

During the last decades, the final felling in forestry has been mechanized very thoroughly. Due to the fact that this final felling was carried out as clean-felling, there has been no need to pay attention to the damage caused by the machines on the remaining trees. The most essential feature was to achieve high capacity and thereby good economy.

The problems are much greater when juvenile forest is to be thinned and when it is tried to mechanize this work. The concern and problems are briefly illustrated in the following points:

1. Due to shortages of wood, juvenile forests must be thinned so that remaining trees can grow faster and yield stems with a greater volume. It is further necessary to make use of the thinned small stems for energy purposes and as contribution to pulp.

2. Manual thinning is physically a very heavy job in this very trying environment. Cold and snow in wintertime, heat, rain and insects in summertime are a few of many environmental problems.

3. Manual thinning is at present a very expensive work, so that there is a great demand of thinning by machine.

4. For transporting wood out of the stand, strip roads must be cut through the area. In order not to interfere with and deteriorate the productive ground in the forest, the strip roads must not be arranged too close to each other. The minimum distance should be about 30 m, but greater distances imply a more productive forest ground area and thereby a substantial increase in total growth.

5. When it was tried to reach with long crane booms into the stand in order to fell and to pull the wood to the strip road, the following problems have arisen:

booms with great length of about 15 m or more are technically advanced, expensive and heavy.

when a tool is attached to the tip of such a long arm, an exceptionally high lifting moment is required in order to balance and control the extended boom with load from a vehicle parked on the strip road. Heavy vehicles cause great damages on the ground and thereby give rise to deteriorated growth.

a long boom is slow to operate and damages too many of the remaining trees, so that these trees in future cannot deliver fully satisfactory wood.

owing to concealing branches and to a long distance, the driver cannot have a good view and, therefore, cannot select the trees which are most suitable to be thinned.

the driver's concentration on the work thus rendered difficult results in an unacceptably high stress. It is difficult to judge the distance at great distances when the tool must be positioned with good precision.

the outward and inward movements of a long and heavy boom cause long cycle times for every single tree. This is unacceptable from a cost point of view, because the thinned trees generally have a small volume. The volume capacity per time unit is too low to be profitable.

The aforesaid problems are solved or reduced by using a thinning machine according to the present invention, which is characterized in that it comprises a two-wheel drive unit with motor and hydraulic unit, and a logging unit supported on a dirigible and driven wheel and comprising a driver's cab, pivotal boom, felling unit and clamping bunk, which logging unit is connected to the driving unit via an articulated frame steering with a bracket and a telescopic arm extending therefrom, which articulated frame steering permits the two units to be put at an angle of more than 90° relative to each other, and the telescopic arm houses necessary hydraulic and electric lines all the way to the logging unit for operating said unit from the driver's cab and can be moved back so over the driving unit, that this unit together with the logging unit forms a compact three-wheel vehicle for transports between the thinning places, and the two-wheel drive unit is provided with a lowerable support for stabilizing the unit when the logging unit is placed at an angle and extended.

Figure 2:
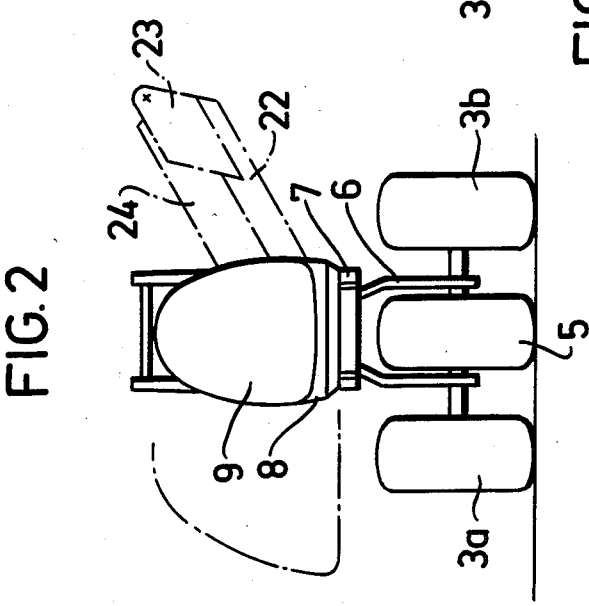
Figure 3:
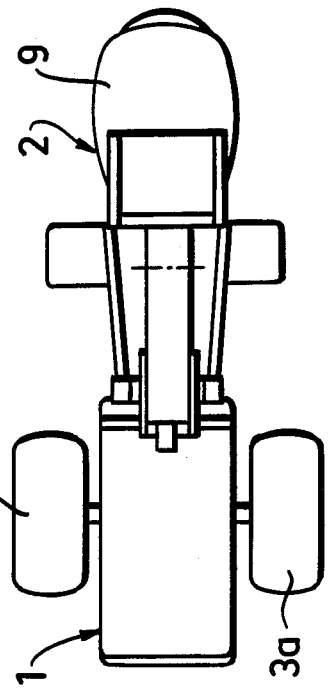
Figure 4:
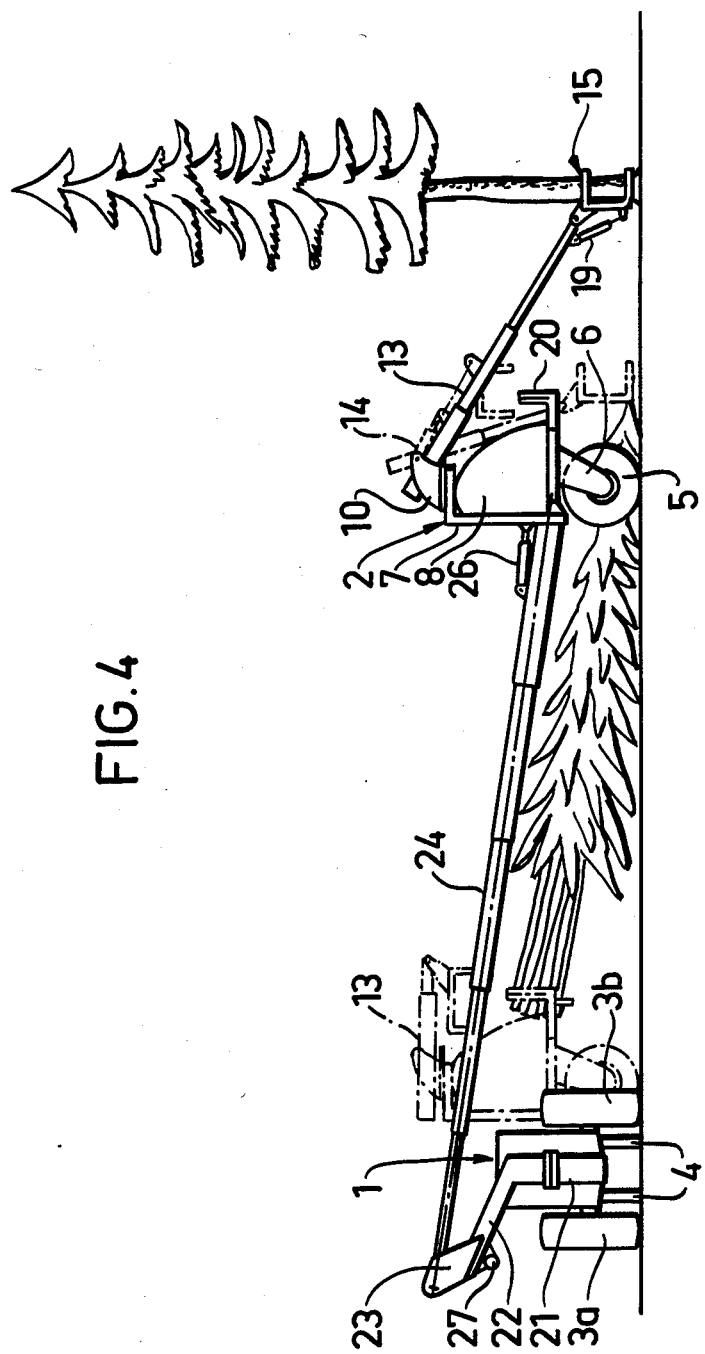
Figure 5:
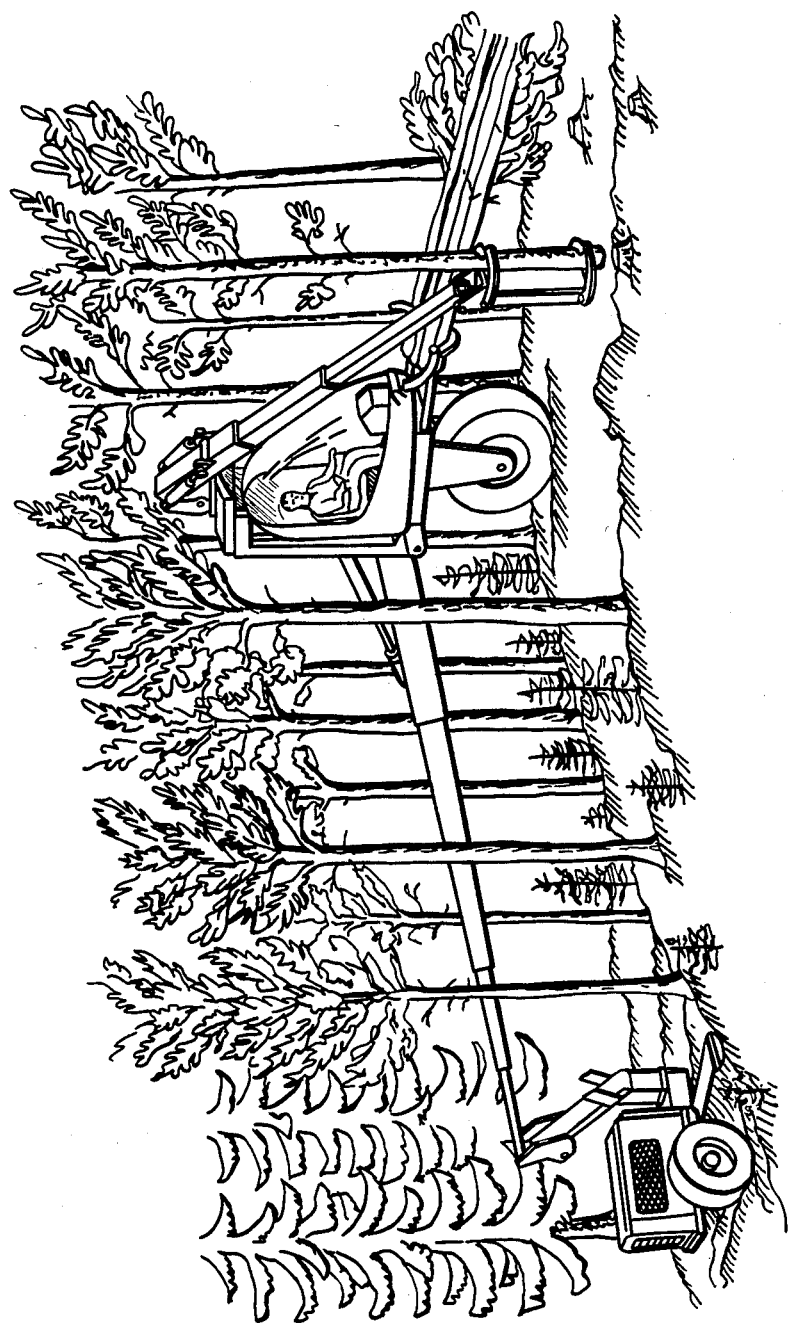

An embodiment of the mobile thinning machine according to the invention is described in the following, with reference to the accompanying drawings, in which FIGS. 1, 2 and 3 are a schematic lateral, front and, respectively, horizontal view of the machine in transport position, FIG. 4 shows the machine carrying out thinning, and FIG. 5 is a perspective view with surroundings.

In FIGS. 1 and 2 a drive unit is generally designated by 1 and a logging unit by 2. The drive unit is supported on two wheels 3a and 3b and houses the equipment for motor and hydraulic operation. The drive unit further is provided forwardly with two supporting legs 4 which individually can be folded down hydraulically.

The logging unit 2 is supported on a dirigible and driven supporting wheel 5 in a fork 6, which is mounted infinitely pivotally in the lower leg of a yoke-like beam frame 7. Said leg in its turn carries the driver's cab 8, which is provided with a limpid dome 9 enabling the driver to have an unlimited view forward, upward and to both sides. This is of special importance in thinning. On the upper leg of the beam frame an attachment 10 is mounted pivotally in the horizontal plane and has two transverse axles 11 and 12. About the firstmentioned axle 11 the base section of a telescopic boom 13 is mounted (see also the dash-dotted extended position), and between the second axle 12 and a lug on the base section of the boom a hydraulic device 14 is located. The outermost section of the boom carries pivotally a felling unit of conventional type generally designated by 15. Said felling unit comprises a frame 16, a schematically indicated grapple device 17, a cutting member 18 and a hydraulic device 19. A clamping bunk 20 is mounted beneath the floor of the driver's cab and can be moved in and out and be operated hydraulically in a way not shown in detail.

The forward end of the drive unit 1 constitutes one part of an articulate frame steering 21, the other part of which has a continuation extending first upward and thereafter inclined backward to form a bracket 22. This bracket terminates in bearing plates 25 where the innermost section of a telescopic arm 24 is mounted in the point 25. The outermost section of the telescopic arm, which in FIG. 1 is shown fully retracted, is supported at its end about a horizontal axle in the rearward end of the lower leg of the beam frame 7, and the beam frame can be pivoted by means of a hydraulic device (see FIG. 4) inserted between a point on the outer section of the arm and the yoke of the beam frame.

It appears from the aforesaid that the driver's cab is entirely relieved of external loads from the felling crane, supporting wheel, clamping bunk and telescopic arm, in that the beam frame takes up all these loads. The driver's cab can hereby also effectively be insulated from vibrations and resonance sound.

At the end of the bracket 22 a winch 27 is attached, the wire of which runs within the telescopic arm 24 and is anchored in the beam frame 7.

It is finally to be mentioned that the supporting legs 4 of the drive unit as well as the beam frame 7 preferably are provided with automatic levelling means, which always maintain the driver's cab in the horizontal plane, irrespective of whether the ground is inclined forward, rearward or to the side.

The arrangement described above operates as follows. The machine, in the transport position shown in FIG. 1, is driven on a strip road to a selected thinning route. The driver there folds down the supporting legs 4 for the drive unit 1 and puts the logging unit 2 about the articulate frame steering 21 through an angle of about 90° relative to the strip road. This moment is indicated by dash-dotted lines in FIG. 4. The driver thereafter moves out the logging unit to a strategic place in the route by driving and steering the supporting wheel 5 and extending the telescopic arm 24. Thereafter the boom 13 is extended to the selected tree for thinning. When the tree has been grabbed and felled, the clamping bunk 20 is pushed out, and the tree is dragged thereon. The procedure is thereafter repeated for the second tree for thinning within the reach of the pivotal boom, as illustrated in FIG. 5. The driver thereafter operates the logging unit back to the strip road and retracts the telescopic arm. This occurs primarily by reversing the driving direction of the supporting wheel, but upon demand (for example when the tree bundle on the clamping bunk moves heavily and the ground at the same time is inclined upward or includes heavy obstacles in the ground) the winch is used. Upon arrival at the strip road the tree bundle is unloaded by retracting the clamping bunk. When this has been completed, the logging unit is bent inward to the drive unit, the retracted telescopic arm is moved to abut the bracket, the supporting legs are lifted, and the boom is pivoted to the position shown in FIG. 1, preferably gripping simultaneously the telescopic arm. The machine is now ready for transport to the next thinning route.

In addition to the rational thinning described above, the following advantages are obtained:

(a) When the machine in transport position must pass steep inclinations in lateral direction, the stability against overturning can be increased substantially by so putting the articulate frame steering at angle that the supporting wheel is moved from the centre substantially to the side in the direction of inclination, at the same time as the supporting wheel is swung to be in parallel with the two other wheels. A further contribution to the stability is that the centre of gravity of the telescopic arm is moved in opposite direction to the supporting wheel when the articulate frame steering is put at angle.

(b) Owing to the rearwardly inclined, relatively long bracket, the logging unit requires a minimum of space at the swing movement on the strip road. Good balancing is obtained as well as a greater "boom length" within the limited width of the strip road. Furthermore, at extended telescopic arm the clearance over local terrain elevations is good.

(c) As the supporting wheel beneath the driver's cab is dirigible with unrestricted steering deflections, it is possible to change the driving more or less rapidly from a first direction to the opposite one. This property is especially favourable when it is desired to quickly turn the machine in transport position on a strip road or a narrow traffic road.

(d) When both supporting legs are pressed strongly against the ground, the entire logging unit is lifted so that its supporting wheels have no ground contact. When only one supporting leg is pressed strongly against the ground, the wheel of the drive unit on the same side is lifted off the ground. This property is very important from a service and repair point of view.

(e) The three wheels are driven hydrostatically each by its wheel motor. During driving in the terrain preferably all wheel drives are engaged, while during road-driving the drive on one or two wheels can be disengaged in order to correspondingly increase the hydraulic force on the remaining wheel or wheels and thereby increase the transport speed.

Various modifications of the arrangement described above can be imagined within the scope of the invention.

What I claim is:

1. A mobile forest thinning apparatus comprising a motor powered vehicle having a hydraulic power unit, a logging unit supported on a power driven dirigible wheel, the logging unit comprising a driver's cab, a tree gripping means, and a pivotally mounted boom having a tree felling means, the logging unit being connected to the vehicle by a sectional telescopic arm having sectins whereby the logging unit can move independently of the vehicle, the vehicle having two wheels and comprising an articulated steering means having a bracket to pivotally support said telescopic arm, the vehicle further comprising at least one retractable ground engaging support member.

2. A thinning apparatus as defined in claim 1, wherein said bracket has a length corresponding substantially to the telescopic arm when retracted and is inclined rearward to abut and receive the telescopic arm in a retracted state.

3. A thinning apparatus as defined in claim 1, wherein the dirigible wheel can be driven rearward, and a winch is attached on said bracket for moving together the sections of the telescopic arm, the winch being operated from the driver's cab, and wherein a winch wire runs through the telescopic arm to the logging unit.

4. A thinning apparatus as defined in claim 1, wherein said ground engaging support comprises of two supporting legs, each of which can be lowered and lifted individually for balancing the drive unit on inclined ground, and further stabilizes the logging unit, said logging unit being pivotally connected to the end of the telescopic arm in a vertical direction.

5. A thinning apparatus as defined in claim 1, wherein the driver's cab is carried by a beam frame, which is pivotally connected to the end of the telescopic arm.

6. A thinning apparatus as defined in claim 1, wherein the driver's cab has a floor and wherein the tree gripping means can be moved hydraulically in and out beneath the floor of the driver's cab.

7. A mobile forest thinning apparatus comprising a motor powered vehicle having a hydraulic power unit, a logging unit supported on a power driven dirigible wheel, the logging unit comprising a driver's cab, a tree gripping means, a pivotally mounted boom having a tree felling means, the vehicle having two wheels and a pivotally mounted inclined bracket member, the bracket having a telescopic arm pivotally connected thereto, the bracket being of a length to receive the telescopic arm when in a retracted form, one end of the telescopic arm connecting the logging unit to the powered vehicle thereby forming an articulated vehicle such that the logging unit can be moved laterally with respect to the vehicle to stabilize the apparatus, the bracket being arranged such that when the logging unit is moved laterally the bracket and the portion of the telescopic arm received in said bracket pivot outward from the vehicle opposite to the logging unit to balance the apparatus, the vehicle further being provided with at least one retractable ground engaging support.

* * * * *